March 29, 1960 G. E. HANSON ET AL 2,930,784
REMOVAL OF SOLIDS FROM POLYMER SOLUTIONS
Filed March 19, 1956
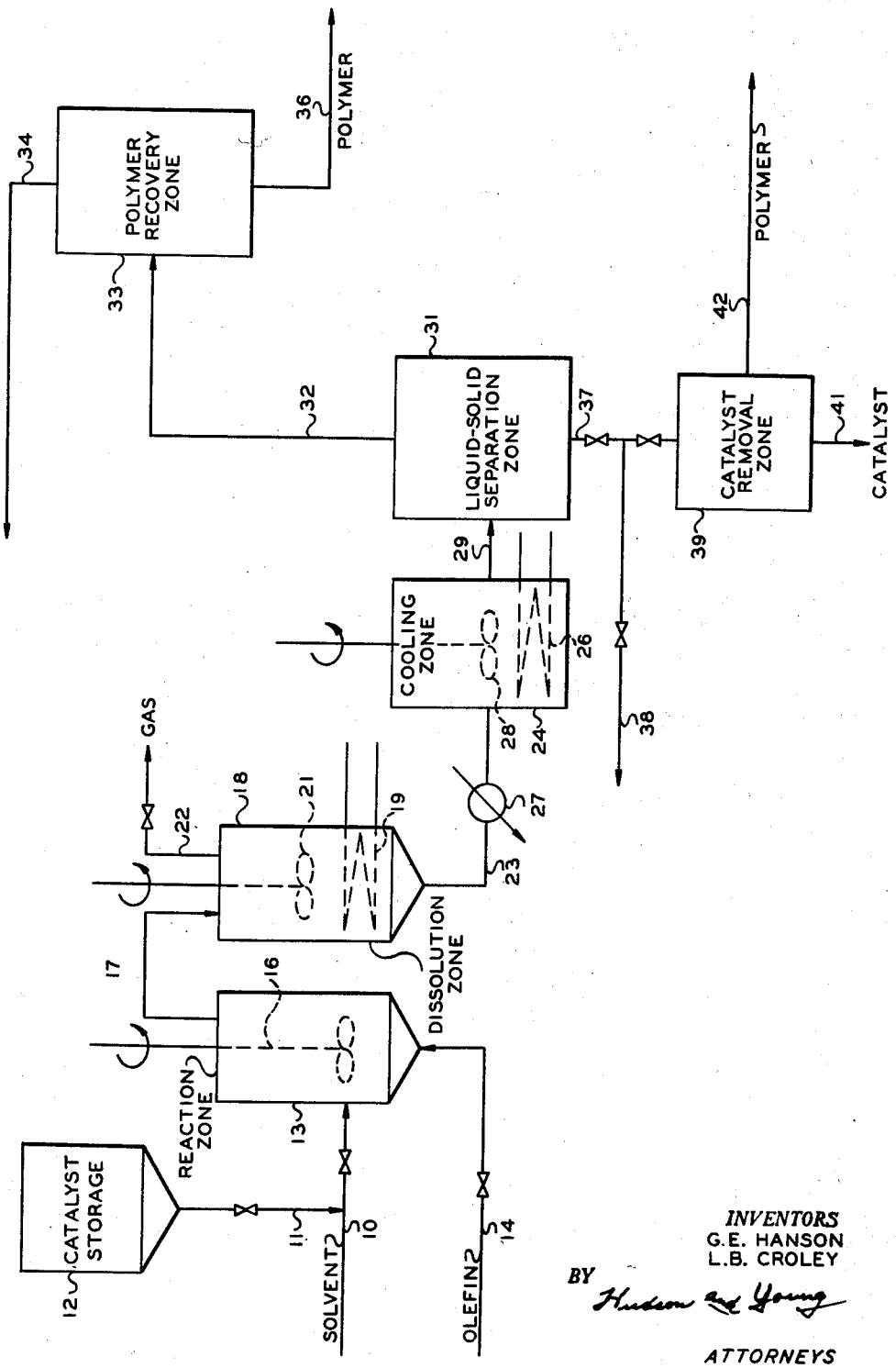
INVENTORS
G.E. HANSON
L.B. CROLEY
BY
*Hudson and Young*
ATTORNEYS _United States Patent Office_ 2,930,784
Patented Mar. 29, 1960

2,930,784

REMOVAL OF SOLIDS FROM POLYMER SOLUTIONS

George E. Hanson and Leo B. Croley, Bartlesville, Okla., assignors to Phillips Petroleum Company, a corporation of Delaware Application March 19, 1956, Serial No. 572,310

13 Claims. (Cl. 260—94.9)

This invention relates to the removal of solids from polymer solutions. In one aspect, it relates to a process for separating suspended solid catalyst from polymer solutions.

There is described in the literature various methods for producing normally solid and semi-solid polymers. For example, hydrocarbons, such as ethylene, propylene, isobutene, butadiene, and styrene, can be polymerized, either independently or in various admixtures with one another, to produce solid or semi-solid polymers. Recently, considerable attention has been directed to the production of solid polymers of ethylene and/or propylene. The polymerizations are frequently carried out in the presence of solid catalysts, utilizing a liquid solvent as the reaction medium. As a result, the polymers recovered from the reactions are often in the form of solutions thereof in liquid solvents, which contain suspended particles of solid catalyst. For many uses, e.g. food containers, bottles, pipe capable of withstanding high pressures, and protective coatings, it is necessary that the polymers have a low ash content. It becomes important, therefore, to provide a method whereby substantially all of the solid catalyst can be removed from the polymer solution.

It is an object of this invention to provide a process for removing solids from polymer solutions.

Another object of the invention is to provide a process for separating suspended solid catalyst from polymer solutions.

A further object of the invention is to provide a process for producing polymers which have a low ash content.

Other and further objects and advantages of the invention will become apparent to those skilled in the art upon consideration of the accompanying disclosure and the drawing, which is a flow diagram illustrating a preferred embodiment of the invention.

Broadly speaking, the instant invention resides in a process for removing suspended solids from a solution of a normally solid polymer in a solvent which process comprises cooling the solution to a temperature at which a minor proportion of the polymer precipitates from solution, thereby agglomerating the suspended solids, and then separating from the solution a mixture of precipitated polymer with at least a portion of the solids.

In a more specific embodiment of the invention, the polymer solution containing suspended catalyst is cooled in a cooling zone to a temperature between zero and 50° F., preferably between 10 and 25° F., above the lower cloud point of the polymer solution. Sufficient agitation is provided in the cooling zone to prevent the polymer, which precipitates as a result of the cooling, from settling. The resulting slurry of solid polymer and catalyst is then passed to a liquid-solid separation zone wherein a substantially catalyst-free solution containing a major proportion of the polymer product is recovered. The recovered polymer solution is then passed to a suitable polymer recovery zone. The solids recovered from the liquid-solid separation zone may be either discarded or passed to subsequent treatment for the recovery of the polymer and any adhering solvent.

The polymer in precipitating out of the polymer solution is believed to adhere to the small catalyst particles which agglomerate, thereby forming larger size particles. The agitation of the polymer solution in the cooling zone in addition to preventing the precipitated polymer from settling therein causes the particles with adhering polymer to contact one another, thereby assisting in the agglomeration of the catalyst particles. When practicing the process of this invention, it is generally preferred to cool the polymer solution only enough to precipitate the amount of polymer necessary to cause agglomeration of the catalyst particles. It is desirable to precipitate only a minimum amount of polymer in order to obviate subsequent treatment of a large amount of catalyst-containing precipitated polymer. In some cases it is possible to obtain a polymer product of acceptable ash content by precipitating such a small amount of polymer that it is more economical to discard the precipitated polymer than to treat it to remove the catalyst.

As is well known, a polymer of a certain average molecular weight is composed of a number of polymers having higher and lower molecular weights. For example, a polymer having an average molecular weight of 50,000 may contain some polymer of a molecular weight as low as 1,000 as well as polymer of a molecular weight as high as 200,000. At a temperature slightly above that at which most of the polymer in a polymer solution precipitates, there is a temperature region in which some of the higher molecular weight polymer precipitates. The temperature range of this region will vary with the particular solvent used and the molecular weight distribution of the polymer solution, but generally it will be between zero and 50° F., above the lower cloud point of the polymer solution.

The concept of cloud point and methods of determining cloud points are well known in the art of hydrocarbon chemistry. Thus, a homogeneous mixture of two or more components can be cooled to a particular temperature at which the appearance of a separate phase, enriched with respect to at least one of the components is reached. The temperature at which the appearance of such a phase is noted is generally termed the "cloud point," since it is detected by the appearance of turbidity or precipitation.

The lower cloud point of a solution of any particular polymer in a hydrocarbon solvent depends on the particular hydrocarbon, the nature of the polymer, the concentration of polymer in the hydrocarbon, the molecular weight of the polymer, and other factors, so that a definite temperature applicable to all solutions of polymer in hydrocarbons cannot be stated with complete accuracy. Nevertheless, the lower cloud point of any particular polymer-hydrocarbon mixture can be readily determined by those skilled in the art by mere routine test, which comprises heating the particular mixture to a temperature at which a single homogeneous liquid solution or phase, as detected by visual observation, is obtained, slowly cooling this solution until cloudiness, which indicates the formation of a second phase, is detected. The temperature at which the cloudiness appears is the lower cloud point. Thus, it has been found that isooctane (2,2,4-trimethylpentane) containing 3 weight percent ethylene polymer (40,000 molecular weight) has a lower cloud point of about 188° F., isooctane containing 5.2 weight percent ethylene polymer (40,000 molecular weight) has a lower cloud point of about 196° F., and isooctane containing 13.2 weight percent ethylene polymer (47,000 molecular weight) has a lower cloud point of about 202° F. In the case of cyclohexane, a solution containing 5 weight percent ethylene polymer (48,000 molecular weight) has a lower cloud point of about 188° F., while a solution containing 10 weight percent of the same polymer has a lower cloud point of about 189° F. The ethylene polymer was prepared by polymerizing ethylene in the presence of a chromium oxide-silica-alumina catalyst.

As indicated hereinabove, the polymer solution being treated in accordance with the instant invention is cooled to a point somewhat above the lower cloud point, in order to precipitate only a minimum amount of polymer. It is to be understood that some precipitation occurs above the lower cloud point even though this phenomenon cannot be detected by visual observation. The accuracy of the lower cloud point determination can be increased in many cases by the use of an instrument such as a nephelometer, a photometer, or any other suitable instrument which measures the light absorption or the scattering effect produced by the precipitation of additional solid or liquid in a mixture. Such instruments are well known in the analytical and instrumental control arts.

The present invention is broadly applicable to the separation of solid materials from solutions of polymers in any type of solvent. However, the invention is especially applicable to the separation of suspended catalyst from solutions of polymers obtained according to the copending patent application of Hogan and Banks, Serial Number 476,306, filed December 20, 1954, now abandoned. As set forth in this application in more detail, unique polymers and copolymers can be produced by contacting one or more olefins with a catalyst comprising, as an essential ingredient, chromium oxide, preferably including a substantial amount of hexavalent chromium. The chromium oxide is ordinarily associated with at least one other oxide, particularly at least one oxide selected from the group consisting of silica, alumina, zirconia, and thoria. One satisfactory method for producing the catalyst comprises the use of a steam-aged commercial cracking catalyst comprising a coprecipitated gel containing approximately 90 weight percent silica and 10 weight percent alumina. Such a gel is impregnated with an aqueous solution of a chromium compound ignitable to chromium oxide. Examples of such compounds are chromium trioxide, chromium nitrate, chromium acetate, and ammonium chromate. The composite resulting from the impregnation step is dried and then contacted for a period of several hours at a temperature of from about 450 to 1500° F., preferably from about 900 to about 1000° F., for example, with a stream of a substantially anhydrous oxygen-containing gas, such as air. The olefin feed used for the polymerization is at least one olefin selected from the class of 1-olefins having a maximum chain length of 8 carbon atoms and no branching nearer the double bond than the 4-position. Examples of such olefins are ethylene, propylene, 1-butene, 1-pentene, and 1,3-butadiene. Copolymers, such as ethylene-propylene copolymers and ethylene-butadiene copolymers, can be prepared by the described method. The polymerization can be effected at a temperature in the range 150 to 450° F. The pressure can range from approximately atmospheric to as high as 1000 p.s.i.

A satisfactory method of conducting the polymerization comprises contacting an olefin with a slurry of catalyst in a hydrocarbon solvent which can exist as a liquid at the temperature of polymerization. In such a case, the reaction pressure need only be sufficient to maintain the solvent substantially in the liquid phase and will ordinarily range from about 100 to about 700 p.s.i. When a solvent is so used, the reaction effluent comprises a mixture of solvent and polymer and contains finely divided suspended catalyst. A method for separating the catalyst from the reaction effluent is necessary if a polymer product of acceptable ash content is to be produced.

Suitable solvents for use in the above described process are hydrocarbons which are liquid and chemically inert under the reaction conditions. Solvents which can be advantageously used include paraffins, such as those having from 3 to 12, preferably from 7 to 9, carbon atoms per molecule, for example, 2,2,4-trimethylpentane (isooctane), normal hexane, normal decane, isopentane, and the like. Another class of solvents which can be used are naphthenic hydrocarbons having from 5 to 6 carbon atoms in a naphthenic ring and which can be maintained in the liquid phase under the polymerization conditions. Examples of such naphthenic hydrocarbons are cyclohexane, cyclopentane, methylcyclopentane, methylcyclohexane, ethylcyclohexane, the methyl ethyl cyclopentanes, the methyl propyl cyclohexanes, and the ethyl propyl cyclohexanes. The described class of naphthenic hydrocarbons includes condensed ring compounds such as decalin and the alkyl derivatives thereof. A preferred subclass of naphthenic hydrocarbons within the above-defined general class is constituted by those naphthenic hydrocarbons having from 5 to 6 carbon atoms in a single ring and from 0 to 2 methyl groups as the only constituents on the ring. Thus, the preferred naphthenic hydrocarbon solvents are cyclopentane, cyclohexane, methylcyclopentane, methylcyclohexane, the dimethylcyclopentanes, and the dimethylcyclohexanes.

A more complete understanding of the invention may be obtained by referring to the drawing, which is a flow diagram illustrating a preferred embodiment of the invention. While the invention will be discussed with relation to the polymerization of ethylene using cyclohexane as the solvent, it is to be understood that it is not intended to limit the invention to any particular polymerization process. As previously indicated, the invention is broadly applicable to the separation of solid materials from solutions of polymer in any suitable solvent.

As shown in the drawing, a suitable solvent, such as cyclohexane, enters the system through inlet line 10. A catalyst, which preferably has a particle size in the range of about 40 to about 100 mesh, is added to the solvent by means of line 11 connecting catalyst storage tank 12 to line 10. The slurry of catalyst in solvent which is thus formed is then pumped into reactor 13. The catalyst can be, for example, a chromium oxide-silica-alumina catalyst prepared by impregnating a 90 weight percent silica and 10 weight percent alumina gel composition with chromium trioxide, drying, and heating in air to obtain a catalyst composition containing approximately 2.5 weight percent chromium in the form of chromium oxide of which approximately half is in the form of hexavalent chromium.

An olefin, such as ethylene, enters the system through inlet line 14 and is intimately contacted with the catalyst slurry in reactor 13. A suitable stirring means 16, driven by a motor (not shown), is provided to facilitate contacting and to maintain the catalyst in suspension in the reaction mixture. The reaction zone can be maintained, for example, at 275° F., and 500 p.s.i. with the reaction time ranging from about 15 minutes to about 10 hours. The reactor effluent, which is withdrawn through line 17, comprises a mixture of polymer, solvent, suspended catalyst, and small amounts of unreacted ethylene. Additional solvent can be added to line 17, if desired, in order to obtain a mixture having a suitable viscosity for transfer through the system. The concentration of polymer is ordinarily adjusted to a value in the range from about 1 to about 15 weight percent, based on polymer plus solvent. The resulting mixture is passed into dissolution zone 18 wherein the mixture is heated by a heating means, such as heating coil 19, and agitated by means of stirring means 21 to ensure complete solution of polymer in the solvent. The dissolution zone is generally maintained at a temperature from 25 to 50° F. higher than reactor 13, a suitable temperature ordinarily being approximately 300 to 325° F. The pressure in dissolution zone 18 is ordinarily lower than that in reactor 13, for example, about 75 to 150 p.s.i. lower, but is still high enough to maintain the solvent in liquid phase. The increased temperature and the reduced pressure can be utilized to remove any unreacted ethylene or other gas, which can be withdrawn through outlet line 22.

The resulting solution containing suspended catalyst is removed from dissolution zone 18 by means of line 23 and then passed into cooling zone 24. Cooling zone 24 is provided with a suitable cooling means, such as cooling coil 26. It is also within the scope of the invention to effect the cooling in the cooling zone by direct heat exchange means rather than indirect means as shown, such as by the addition of cold solvent to the cooling zone. If desired, a cooler 27 may be provided in line 23 in order to accomplish a partial cooling of the polymer solution prior to its introduction into the cooling zone. In the cooling zone, the polymer solution is cooled to a temperature sufficient to cause precipitation of a minor proportion of the polymer in solution. The solution in the cooling zone is continuously agitated by stirring means 28 so as to prevent settling of the precipitated polymer. As previously indicated, the temperature at which it is desired to operate the cooling zone is, in general, between zero and 50° F. above the lower cloud point of the particular polymer solution being treated. It has been found that when operating in this temperature range, about 1 to 15 percent of the polymer in solution is caused to precipitate. The polymer in precipitating adheres to the finely divided catalyst suspended in the polymer solution, thereby causing the particles to agglomerate and form larger size particles. The agglomeration of the catalyst particles is assisted by the stirring of the polymer solution, which causes the catalyst particles and adhering polymer to contact one another.

The resulting slurry of solid polymer and catalyst is removed from the cooling zone through line 29 and passed into liquid-solid separation zone 31. This zone may be a settling tank, a cyclone separator, a centrifuge, a filter, or other suitable means for accomplishing the separation of a liquid from solids. An essentially catalyst-free solution containing a major proportion of the polymer product is recovered from separation zone 31 by means of line 32 and passed to polymer recovery zone 33. Zone 33 can be any suitable means for recovering polymer from a solution thereof in a solvent and can comprise, for example, a series of evaporation steps as described in more detail in the copending application of Martin R. Cines, Serial No. 496,515, filed March 24, 1955. The zone can also comprise cooling and filtration equipment whereby the dissolved polymer is precipitated from solution by cooling the solvent to a temperature below the lower cloud point and subsequently filtering. Solvent recovered from zone 33 through line 34 can be recycled to line 10. A polymer, which may have a lower average molecular weight than that of the total polymer produced in reaction zone 13, is recovered through outlet line 36. This polymer preferably has a molecular weight only slightly lower than that of the total polymer produced, and this is accomplished, as previously described, by precipitating in cooling zone 24 only a minimum of polymer which will have a very high molecular weight as compared to that of the total polymer produced. It is also within the scope of the invention to utilize a filter, such as a cartridge-type filter, in line 32 in order to effect the removal of catalyst which may still remain in the polymer solution recovered from zone 31. The use of a cartridge-type filter in this line is made possible by the fact that substantially all of the solid material has been separated from the solution in zone 31.

Referring again to liquid-solid separation zone 31, the separated polymer phase containing most of the suspended catalyst is withdrawn through line 37. If desired, this stream can be removed from the system through line 38 and either discarded or utilized in applications in which the presence of catalyst is not deleterious. For example, it may be used in the fabrication of pipe which will not be subjected to high pressures. Alternatively, the separated polymer phase can be passed to catalyst removal zone 39 wherein the polymer can be dissolved in any suitable solvent, the catalyst separated therefrom by filtration, centrifugation, or other suitable means, and then removed through outlet 41. The polymer which is recovered from catalyst removal zone 39 through line 42 has a far higher molecular weight than the total polymer produced in the polymerization reaction. In the separation of the catalyst from the polymer phase in catalyst removal zone 39, the volume of polymer solution is ordinarily small as compared to the volume of the reactor effluent. As a result, the load on the solids removal zone is considerably less than would be the case if a similar zone were used to remove the catalyst from the reactor effluent. Instead of treating the polymer phase in catalyst removal zone 39, the catalyst can be separated therefrom by dissolving the polymer in a solvent and thereafter treating the polymer solution in a cooling zone and a liquid-solid separation zone as described in conjunction with the drawing.

A more complete understanding of the invention can be obtained by referring to the following illustrative example which is not intended, however, to be unduly limitative of the invention.

*Example*

Three runs were made in which different polymer solutions were treated in a 150 gallon, agitated vessel, following the same procedure for each of the runs except as noted below with regard to run No. 3. The solutions, which were initially at 300° F., 275° F., and 300° F., respectively, were air-cooled with the vessel agitator running. After cooling the solutions to the temperatures indicated in the table set forth hereinbelow, the agitator was shut-off and the solutions were allowed to settle. At 30 and 60 minute intervals after the agitator was shut off, samples were taken from the vessel at different points below the surface of the solutions. In run No. 3 the agitator was run again in cooling from 205 to 200° F., and samples were also taken 30 minutes (at 200° F.) and 60 minutes (at 190° F.) after the agitator was shut off a second time. These samples were analyzed to determine the weight percent solids (polymer plus catalyst) contained therein, and the polymer was analyzed to determine the weight percent ash. The melt index of certain of the samples was also determined. The data obtained with regard to the three polymer solutions are presented in the table.

The polymers, which were in solution in cyclohexane, were produced by polymerization of ethylene in the presence of a 40 to 100 mesh catalyst prepared by impregnating a 90 weight percent silica-10 weight percent alumina coprecipitated gel composite with an aqueous solution of chromium trioxide, drying, and heating for several hours in a stream of anhydrous air at about 950° F. The polymerizations were conducted by contacting a mixture of ethylene and cyclohexane with the catalyst in the form of a slurry in cyclohexane at temperatures in the range of 280 to 300° F. and at a pressure of about 450 p.s.i.g. The amount of solids (polymer plus catalyst) contained in the polymer solutions is as indicated in the table.

Table

RUN NO. 1

| Solution Temp. (° F.) | Settling Time (Min.) | Settling Dist., Inches | Analysis | | Melt Index |
|---|---|---|---|---|---|
| | | | Weight Percent Solids in Solution | Weight Percent Ash in Dry Polymer | |
| 300* | 0 | 0 | 3.74 [1] (3.59% Polymer, 0.15% Catalyst). | 3.97 | |
| 210 | 30 | 6 | 3.70 | 4.14 | |
| 210 | 30 | 35 | | 4.62 | |
| 210 | 60 | 6 | 3.73 | 5.33 | |
| 210 | 60 | 35 | | 4.82 | |

RUN NO. 2

| 275* | 0 | 0 | 4.42 [2] (4.16% Polymer, 0.26% Catalyst). | 5.96 | |
| 205 | 30 | 6 | | 0.30 | |
| 205 | 30 | 35 | | 1.79 | |
| 205 | 60 | 6 | | 0.28 | |
| 205 | 60 | 35 | | 0.30 | |

RUN NO. 3

| 300* | 0 | 0 | 4.82 [2] (4.55% Polymer, 0.27% Catalyst). | 5.57 | 0.48 |
| 205 | 30 | 20 | 4.36 | 0.34 | 0.51 |
| 205 | 30 | 49 | 4.36 | 0.43 | |
| 205 | 60 | 20 | | 0.35 | 0.45 |
| 205** | 60 | 49 | 4.15 | 0.33 | |
| 200 | 30 | 20 | 4.21 | 0.01 | 0.63 |
| 200 | 30 | 49 | 4.26 | 0.03 | |
| 190 | 60 | 20 | 4.50 | | 0.63 |
| 190 | 60 | 49 | 4.27 | 0.03 | |

*Agitator run during cooling to the indicated lower temperature and then shut off.
**Agitator run during cooling from 205 to 200° F. and then shut off.
[1] Lower cloud point—about 187° F.
[2] Lower cloud point—about 188° F.

From a consideration of the data presented in the table, it is seen that at 210° F. there was no indication of any settling. At 205° F., settling occurred and there was an appreciable decrease in the ash content after settling. In the case of both of the solutions which were cooled to 205° F., the ash content was in the range of 0.30 to 0.35 weight percent. A sample of the settled material contained 54.3 weight percent ash which corresponds quite closely with the drop in weight percent solids after settling. There was no appreciable change in melt index at 205° F.

When the temperature was lowered to 200° F. and 190° F., the ash content dropped to the .01 to .03 weight percent ash range, but there was an increase in melt index, indicating a loss of some of the higher molecular weight polymer.

From the foregoing, it will be seen that a method has been provided whereby solid material, such as suspended catalyst, can be separated from polymer solutions. While the invention has been described with relation to a specific polymerization process utilizing solvents such as paraffinic and naphthenic hydrocarbons, it is to be understood that it is not intended to so limit the invention. Thus, the invention is broadly applicable to the separation of solid material from solutions of polymer in any suitable solvent.

It will be apparent to those skilled in the art that variations and modifications of the invention can be made from the study of the foregoing disclosure. Such variations and modifications are believed to be clearly within the spirit and scope of the invention.

We claim:

1. A process for removing suspended solids from a solution of a normally solid polymer in a solvent, which comprises cooling said solution to a temperature at which a minor proportion of the polymer precipitates from solution, thereby agglomerating said suspended solids; and separating from said solution a mixture of precipitated polymer with at least a portion of said solids.

2. A process according to claim 1 wherein said polymer is a polymer of ethylene, said solids include catalyst utilized to produce said ethylene polymer, and said solvent is a hydrocarbon.

3. A process for removing suspended solids from a solution of a normally solid polymer in a solvent which comprises cooling said solution to a temperature between zero and 50° F. above the lower cloud point of said solution, thereby agglomerating said suspended solids; and separating from said solution a mixture of precipitated polymer with at least a portion of said solids.

4. The process of claim 3 in which said solution is cooled to a temperature between 10 and 25° F. above the lower cloud point of said solution.

5. A process for removing suspended catalyst from a solution of normally solid polymer in a hydrocarbon solvent which comprises cooling said solution in a cooling zone to a temperature between zero and 50° F. above the lower cloud point of said solution; continuously agitating said solution during said cooling; passing a resulting slurry of solid polymer and catalyst in polymer solution into a separation zone; and recovering from said separation zone a substantially catalyst-free polymer solution.

6. In a process wherein ethylene is polymerized in admixture with at least one hydrocarbon selected from the group consisting of normally liquid paraffins and naphthenes in the presence of a catalyst comprising a minor amount of chromium in the form of chromium oxide, and containing a substantial amount of hexavalent chromium, associated with at least one oxide selected from the group consisting of silica, alumina, zirconia and thoria, at a temperature in the range of 150 to 450° F., and a pressure sufficient to maintain the reaction mixture substantially in the liquid phase, and a solution of product polymer in said hydrocarbon and containing suspended catalyst is obtained, the improvement which comprises cooling said solution to a temperature at which a minor proportion of the polymer precipitates from solution, thereby agglomerating said suspended catalyst; and separating from said solution a mixture of precipitated polymer with at least a portion of said catalyst.

7. A process according to claim 6 wherein said solution is cooled to a temperature between zero and 50° F. above the lower cloud point of said solution and said solution is continuously agitated during said cooling.

8. A process according to claim 6 wherein said hydrocarbon is a paraffin having from 7 to 9 carbon atoms per molecule.

9. A process according to claim 6 wherein said hydrocarbon is a naphthene having from 5 to 6 carbon atoms in a naphthenic ring.

10. A process according to claim 6 wherein said hydrocarbon is 2,2,4-trimethylpentane.

11. A process according to claim 6 wherein said hydrocarbon is cyclohexane.

12. A process for removing suspended catalyst comprising chromium oxide supported on silica-alumina from a solution of a normally solid olefin polymer in a solvent selected from the group consisting of normally liquid paraffins and naphthenes which comprises cooling said solution to a temperature between zero and 50° F. above the lower cloud point of said solution, thereby agglomerating said suspended catalyst, and separating from said solution at least a portion of said agglomerated catalyst.

13. The process of claim 12 in which said solid olefin polymer is polyethylene.

References Cited in the file of this patent

UNITED STATES PATENTS 2,379,237    Jenkins _____ Jan. 26, 1945

FOREIGN PATENTS 530,617    Belgium _____ Jan. 24, 1955